(12) United States Patent
Laura

(10) Patent No.: US 7,921,412 B1
(45) Date of Patent: Apr. 5, 2011

(54) APPLICATION MONITOR SYSTEM AND METHOD

(75) Inventor: Joseph G. Laura, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1340 days.

(21) Appl. No.: 10/723,967

(22) Filed: Nov. 26, 2003

(51) Int. Cl.
*G06F 9/44* (2006.01)
*G06F 3/00* (2006.01)
*G06F 15/167* (2006.01)

(52) U.S. Cl. .................... 717/127; 719/312; 709/213

(58) Field of Classification Search .................. None
See application file for complete search history.

(56) References Cited

U.S. PATENT DOCUMENTS

| | | | | |
|---|---|---|---|---|
| 5,745,748 | A * | 4/1998 | Ahmad et al. | 707/10 |
| 6,957,422 | B2 * | 10/2005 | Hunt | 717/130 |
| 7,086,033 | B2 * | 8/2006 | Bates et al. | 717/124 |
| 7,340,731 | B2 * | 3/2008 | Laura | 717/149 |
| 7,340,735 | B2 * | 3/2008 | Laura | 717/159 |
| 2002/0174415 | A1 * | 11/2002 | Hines | 717/127 |
| 2003/0221186 | A1 * | 11/2003 | Bates et al. | 717/125 |
| 2004/0268363 | A1 * | 12/2004 | Nace et al. | 719/312 |

OTHER PUBLICATIONS

Zielinski et al., A Tool for Monitoring Software-Heterogeneous Distributed Object Applications, 1995, IEEE, pp. 11-18.*
H. Kashima, An Approach for Constructing Web Enterprise Systems on Distributed Objects, Jan. 2000, IBM, pp. 1-24.*
Sridharan et al., "On Building Non-Intrusive Performance Instrumentation Blocks for CORBA-based Distributed Systems", 2000, IEEE, pp. 1-5.*
Tao et al., "Understanding the Behavior of Shared Memory Applications Using the SMiLE Monitoring Framework", Aug. 2000, Sci-Europe 2000, Munchen, Germany, pp. 1-6.*
Huang et al., "Operating System Support for Flexible Coherence in Distributed Shared Memory", 1996, IEEE, pp. 92-101.*
Tao et al., "Visualizing the Memory Access Behavior of Shared Memory Applications on NUMA Architectures", Springer-Verlag Berlin Heidelberg 2001, pp. 861-870.*
Object Oriented COBOL, *Fujitsu Computers—Siemens*, Aug. 13, 2003, 1 page, www..fujitsu-siemens.com website.
Archive of—dBforums, *dBforums Archive for* comp.lang.cobol, Aug. 13, 2003, 11 pages, http://dbforums.com website.
Enterprise COBOL for z/OS and OS/390, *IBM*, Aug. 13, 2003, 3 pages, www-3.ibm.com website.
Laura, Joseph G., Implementation of Distributed and Asynchronous Processing in Cobol, Filing Date—Oct. 30, 2003, U.S. Appl. No. 10/696,895.
Laura, Joseph G., System and Method for Distributed Processing in Cobol, Filing Date—Oct. 30, 2003, U.S. Appl. No. 10/696,828.

* cited by examiner

*Primary Examiner* — Tuan Q Dam
*Assistant Examiner* — Ben C Wang

(57) ABSTRACT

A system and method for monitoring an application is provided. The system comprises a first module operable to read application values stored in a memory area by the application, a second module in communication with the first module and operable to request the first module to read the application values, the second module further operable to receive the application values from the first module, and a third module in communication with the second module, the third module operable to display the application values. A system for non-intrusively monitoring variables during operation of an application is also provided.

36 Claims, 3 Drawing Sheets

APPLICATION MONITOR SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software, and more particularly, but not by way of limitation, to a system and method for monitoring a computer application.

BACKGROUND OF THE INVENTION

In the realm of system and software operation and development, it is sometimes useful to monitor applications during operation. Software applications, computer programs, software subroutines, software modules, or software components (hereinafter referred to as applications) may write intermediate information to internal variables which are not output by the application. Because the content of these intermediate variables is not output, the content of these variables is not generally accessible to testers or other programs. For this reason, it may be difficult, for example, to debug applications operating erroneously without sufficient understanding of these intermediate variables or stages of processing of the application. Monitoring applications and these intermediate variables may be warranted for a number of other reasons.

SUMMARY OF THE INVENTION

The present disclosure provides a system for monitoring an application. The system comprises a first module operable to read application values stored in a memory area by the application, a second module in communication with the first module and operable to request the first module to read the application values, the second module further operable to receive the application values from the first module, a third module in communication with the second module, the third module operable to display the application values.

In another embodiment a method of monitoring operation of an application is provided. The method comprises running an application, generating application values stored in a memory area, reading the memory area used by the application to obtain the application values, and displaying the requested application values.

In another embodiment a system for non-intrusively monitoring variables during operation of an application is provided. The system comprises a compile listing having an address map with an offset for at least one variable of an application and a module operable to read the compile listing and obtain the offset of the at least one variable of the application, the module further operable to attach to a memory area where the application is operating to obtain a value for the variable using the offset.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

It is often desirable to access the values of internal variables of applications. The software developer may desire to view these internal variable values to help understand and fix the operation of his application during the testing phase. A business analyst may want to have access to internal variables to optimize the interactions among multiple independent applications. Generally, however, these values are not accessible.

Shared Memory Embodiment

Figure 1:
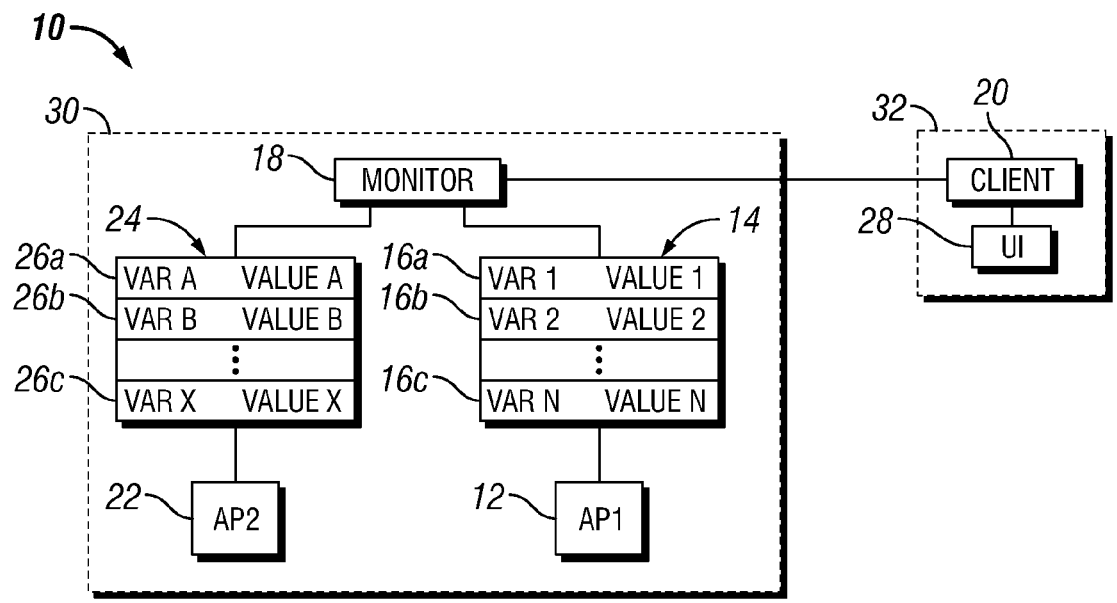
FIG. 1 is a block diagram of an application monitor system according to one embodiment.

Turning now to FIG. 1 a block diagram of an application monitor system 10 for accessing the value of internal application variables is depicted. A first application 12 is programmed or coded to create a first shared memory 14 and to write values into variables var1 16a, var2 16b, and varN 16c contained within the first shared memory 14. In addition, the first application 12 is coded to perform the task allocated to the first application 12. In the present embodiment, the first application 12 runs in a normal, real-time operational mode, as opposed to running under a debugger or other tool employed to encapsulate the first application 12. While the first application 12 is in real-time operation, whether during testing or other simulated conditions, or otherwise running, a monitor module 18 is operable to read the values of the variables 16 from the first shared memory 14 and is in communication with a client 20. A second application 22 is programmed or coded to create a second shared memory 24 and to write values into variables varA 26a, varB 26b, and varX 26c contained within the second shared memory 24. The monitor module 18 is operable to read the values of the variables 26 from the second shared memory 24.

A user interface 28 is in communication with the client 20. The user interface 28 is operable to select the applications 12, 22 and to select the variables 16, 24 and to communicate these selections to the client 20. The client 20 requests the values of the variables 16 and 26 stored in the first and second shared memory 14 and 24, based on the variables 16 and 26 selected by the user interface 28. The client 20 receives the values of these variables 16 and 26 from the monitor module 18 and communicates the values of these variables 16 and 26 to the user interface 28. The user interface 28 is further operable to display the values of variables 16, 26 for presentation to a user. Note that while two applications are depicted in FIG. 1, any number of applications executing on the computer system 30 may be concurrently monitored by the monitor module 18. Also note that while the client 20 is depicted communicating with only one monitor module 18, the client 20 may communicate concurrently with multiple monitor modules 18.

In some embodiments the client 20 may be programmed to periodically request the value of a variable and to send this value to the user interface 28. In this case, the user interface 28 may designate to the client 20 a variable for monitoring, and the client 20 may repeatedly request the value of the designated variable from the monitor module 18 at some periodic rate, for example once per second or ten times per second.

The applications 12, 22 and the monitor module 18 are computer programs or applications which execute on a general purpose computer system 30. The shared memories 14, 24 are located in the random access memory or in the secondary storage of the general purpose computer system 30. The client 20 and the user interface 28 are computer programs or applications which execute on a general purpose computer system 32. General purpose computer systems will be discussed in more detail hereinafter.

The first application 12 is programmed so when it runs it first creates the first shared memory 14 and then writes some variables of interest out to variables 16 in the first shared memory 14 whenever the application changes the value of those variables 16. The action of the first application 12 writing these values to the variables 16 in the first shared memory 14 does not interfere with the normal operation of the first application 12. These variables 16 may include an identifier, such as a variable name, and may have a value associated with the identifier. Both the identifier and value of each variable 16 are made available for display on the UI 28 through the application monitor system 10 through the monitor module 18 reading these values and identifier of each variable 16 from the first shared memory 14, the monitor module 18 sending these values and variable names to the client 20, and the client 20 sending these values and variable names to the user interface 28. If the first application 12 does not write an internal variable to the first shared memory 14, then this internal variable is not accessible to the monitor module 18 and hence not accessible to the client 20. For example, if EmployeeSocialSecurityNumber is an internal variable of the first application 12 and the first application 12 does not write the value of EmployeeSocialSecurityNumber to the first shared memory 14, then the monitor module 18 may not be able to access the value of EmployeeSocialSecurityNumber.

The user interface 28 may make various uses of the data access provided by the application monitor system 10. This data may be periodically written to a database or to a file. The data may be employed to generate one or more graphical depictions of current operating conditions including bar charts and pie charts. The data may be employed to track and display a "heartbeat" indication of the health of an application. Some data may be monitored and used as a trigger by other applications to take action. The user interface 28 may be used interactively to select variable values for display and to display those selected variable values.

In some embodiments the client 20 may send the variables 16, including the variable name and variable value, to the user interface 28 in extensible markup language (XML) format. XML supports flexible formatting of the variable names and variable values for transmission to the user interface 28.

The client 20 and monitor module 18 may communicate using a socket connection. A socket is a communication mechanism which is provided by some operating systems to support communications between processes located on the same computer system and between processes located on separate computer systems. Typically, one party to a socket connection is allocated the responsibility of being ready at any time to receive a socket connection request and to establish the socket connection in response to this connection request. This party to a socket connection is called the socket server. The second party to the socket connection requests a socket connection from the socket server at any time and is called the socket client. The socket server may serve multiple concurrent socket connection requests. The socket server may establish and maintain several concurrent socket connections with different socket clients. Operating systems which support sockets typically provide a set of system calls which provide mechanisms to control socket connections. When sockets are employed, the monitor module 18 acts as a socket server and the client 20 acts as a socket client.

In some embodiments the monitor module 18 and the client 20 may be programmed in the Common Business Oriented Language (COBOL) programming language. Unfortunately COBOL may not provide support for sockets or for shared memory. In this case some embodiments may employ a technical layer which provides a means for COBOL programs to avail themselves of certain features, including sockets and shared memory, which otherwise would not be accessible to these COBOL programs. The technical layer in this example provides a plurality of routines including a shared memory routine and a sockets routine. The shared memory routine provides the COBOL program with the functionality to enable memory sharing on the computer 30 between applications, for example between the applications 12, 22 and the monitor module 18. The socket routine enables the COBOL program to communicate information between applications on the same computer and between applications on different computers, for example between the monitor module 18 and the client 20.

In addition to providing convenient means for COBOL programs to access operating system features, the technical layer isolates the COBOL programs which invoke technical layer routines from changes in the underlying operating system. The technical layer may be separated into multiple layers including a layer having various operating system calls for compatibility with specific operating systems, such that only a portion of the technical layer would be replaceable to enable compatibility with other operating systems. This would simplify the use of alternate versions of the technical layer for multiple operating systems by abstracting the specific calls to a single layer while leaving the other interface layers facing the COBOL programs the same. This provides for changes in the technical layer to accommodate different operating systems which would be transparent to the COBOL programs using the technical layer. For additional information related to employing the COBOL technical layer and the role of the shared memory routine and the socket routine see U.S. patent application Ser. No. 10/696,895, filed Oct. 30, 2003, entitled "Implementation of Distributed and Asynchronous Processing In COBOL" by the above-named inventor, incorporated herein by reference for all purposes.

Technical Layer Shared Memory Routine

Figure 2:
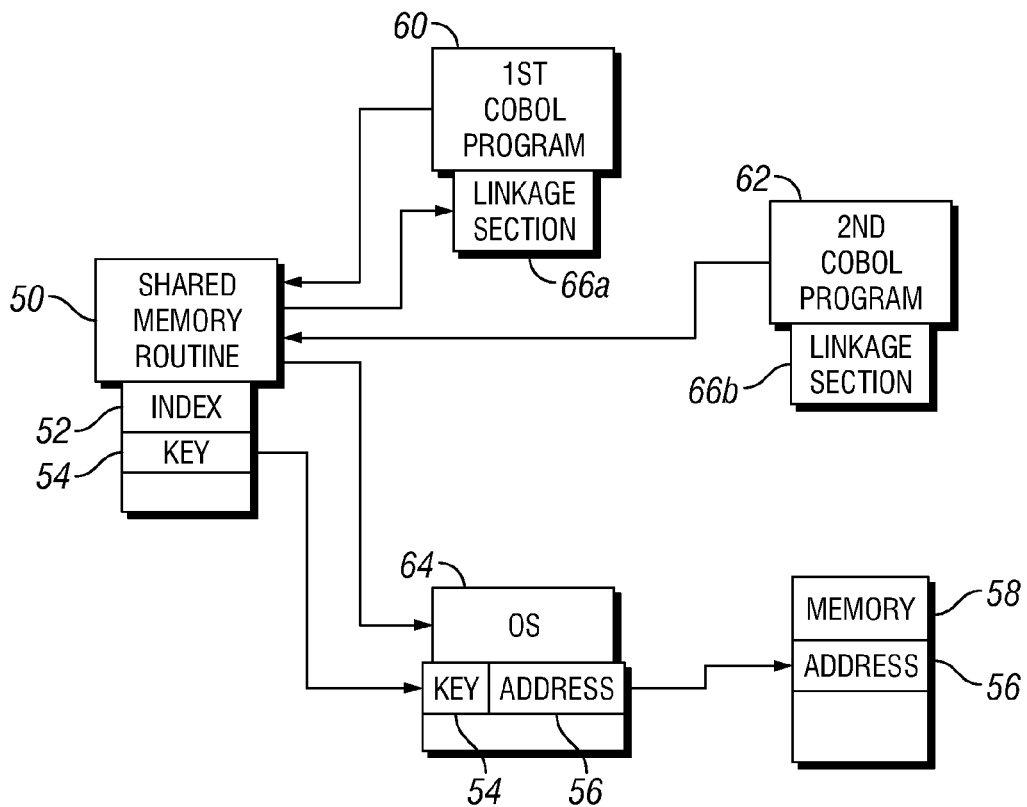
FIG. 2 illustrates a shared memory routine for enabling shared memory in COBOL programs.

FIG. 2 illustrates one embodiment of the shared memory routine 50 for sharing memory between COBOL programs. The shared memory routine 50 is provided with an index 52 for maintaining a plurality of keys 54 related to an address 56 of the memory 58 which is utilized as shared memory by the first and second COBOL programs 60 and 62. The first COBOL program 60 requests shared memory from the shared memory routine 50. The shared memory routine 50 includes a plurality of functions operable for managing shared memory, including a create function for creating a shared memory block. According to one embodiment, the shared memory routine 50 is a COBOL program which issues an operating call to the operating system 64 to allocate memory for sharing between COBOL programs.

Where the shared memory routine 50 is provided as a COBOL library, the first COBOL program 60 and the shared memory routine 50 may be compiled to enable this functionality. The amount of memory needed by the first COBOL program 60 is designated by the first COBOL program 60, at compile time, and the operating system 64 allocates the memory required for the working storage section of the first COBOL program 60. The operating system obtains the address 56 for the designated memory 58 to be shared between the COBOL programs. Once the shared memory has been identified, the first COBOL program 60, using an identifier, such as an alphanumeric identifier or name, in some embodiments, via a request to the shared memory routine 50.

The shared memory routine 50 maintains the identifier and the index 52 associated with the key 54. The shared memory routine 50 uses the key 54 to issue a request to the operating system for the associated address 56 of the memory 58. The operating system 64 passes the address 56 back to the shared memory routine 50, which in turn passes the address 56 back to the linkage section 66a of the first COBOL program 60.

The linkage section 66a of the first COBOL program 60 is typically used for passing information between subprograms or calling programs, but is employed here to map to the address 56 of the memory 58 that is used for shared memory. Mapping the address 56 to the linkage section 66a of the first COBOL program 60 is useful since shared memory only needs to be loaded one time and does not require constant refreshing. For example, data space is a section of mainframe memory that stays resident when programs exit, but requires a task running to keep the memory refreshed. Core loads are another example of memory employed in mainframe computer systems, but when the program using the memory exits or closes, the memory is released and the data is no longer available. Employing the shared memory routine 50, the memory is maintained by the shared memory routine 50 even after the first COBOL program 60 terminates.

The second COBOL program 62, using the identifier such as the name, requests the address 56 of the memory 58 wherein the shared memory is located. The shared memory routine 50 returns the address 56 in a similar manner based on the use of the same identifier or name. The address 56 of the shared memory is mapped back to the linkage section 66b of the second COBOL program 62 thereby creating a shared block of memory useable by both the first and second COBOL programs 60 and 62.

The shared memory routine 50 is efficient since the address 56 of the array to the shared memory block is used only once and may be accessed by a plurality of COBOL programs via the shared memory routine 50. In addition to those routines previously described, the shared memory routine 50 includes additional functions, such as an attach function to attach to an existing block of memory, a detach function to detach from an existing block of memory, a remove function to remove a shared memory block from the system, and a query function to determine whether a shared block of memory exists, the size of the shared memory block, and additional information with regard to the shared memory block maintained by shared memory routine 50.

In some aspects, the shared memory routine 50 may be provided with additional indexes 100 maintaining identifiers other than alphanumeric or name identifiers or other types of identifiers or only a key queryable by the COBOL programs. In some aspects, the shared memory routine 50 monitors the shared memory when the memory is protected to prevent the shared memory from being overwritten. In other aspects, the memory is unprotected and the shared memory routine 50 allows the COBOL programs to read and write from memory in unrestricted manner.

In some aspects the shared memory routine 50 manages the protected and unprotected aspects of the shared memory by virtue of the specific operating system call, whereby the operating system 64 manages the protection of the block of memory 58 used for shared memory.

Technical Layer Socket Routine

Figure 3:
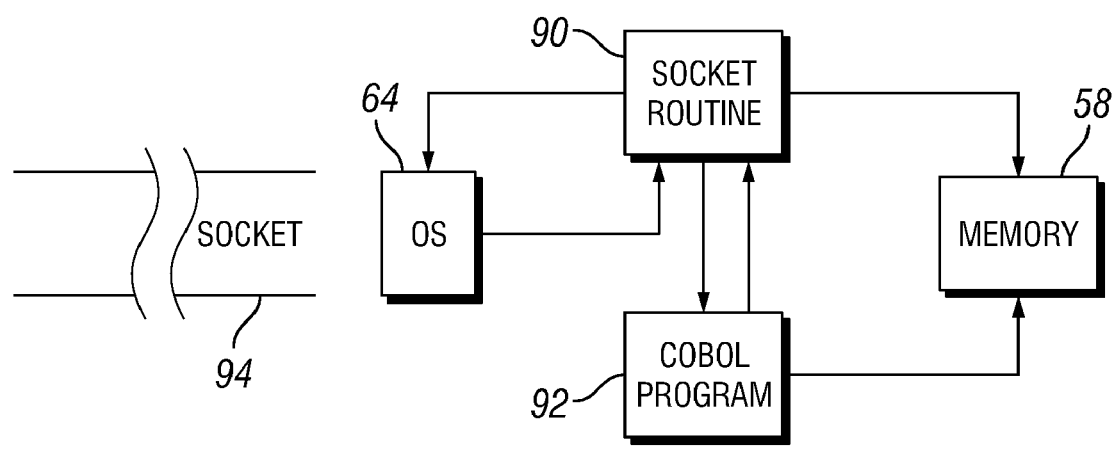
FIG. 3 illustrates a socket routine for enabling socket communications in COBOL programs.

FIG. 3 is a diagram illustrating the functionality of the socket routine 90 for enabling the COBOL program 92 for communication with a socket 94. The socket 94 may represent a communication channel established between one or more computer systems, such as the computer 30 and the computer 32 (see FIG. 1). Functionally, the COBOL program 92 requests communication, via a socket, from the socket routine 90. The socket routine 90 establishes the socket connection with the socket 94, such as by a call to an operating system 64. The operating system 64 may be any operating system operable on the computer 30 or 32. In the present embodiment, the COBOL program 92 is operable on an IBM mainframe computer system using a zOS operating system.

For example, the COBOL program 92 may initiate an operating system 64 call to an operating system function to accept a connection request from a client. An example of such an operating call is provided in the operating system's callable services reference manual. It may be necessary to refer to specific documentation for the operating system 64 where the technical layer and COBOL program 92 will be used to determine the correct syntax and functionality. The operating system calls, including the syntax and techniques for the COBOL program 92 to communicate with the operating system 64 via the technical layer, may vary greatly depending upon the desired operating system 64. For a more complete understanding of socket communications in COBOL see U.S. application Ser. No. 10/696,895, filed Oct. 30, 2003, entitled "Implementation of Distributed and Asynchronous Processing In COBOL" which, as mentioned above, is incorporated herein by reference.

Once the socket routine 90 establishes the connection with the socket 94, via the operating system 64, the socket routine is then operable to read and write information from the socket 94. The socket routine 90 receives information from the socket 94 and writes the information to a memory 58, such as a block of memory of the computer 30, 32. In one aspect, such as on a mainframe, the socket routine 90 receives the information from the socket and is operable to convert the information, depending upon the format useful for the particular platform. For example, the socket routine 90 may receive the information in ASCII format and convert the information to EBCDIC format for use on a mainframe, or vice-versa.

The COBOL program 92 then reads the information from the memory 58 thus enabling the COBOL program 92 to communicate via the socket 94. In one aspect, the COBOL program 92 allocates the memory 58, and thus obtains the address of the memory 58, while in other aspects the socket routine 90 establishes the memory 58 and the COBOL program 92 obtains the address of the memory 58 from the socket routine 90. In either case, the COBOL program 92 employs the address of the memory 58 and lays a map over the memory 58 to read the information from the memory 58. According to one aspect, the COBOL program 92 may employ a copybook for reading the memory 58 information into the COBOL program 92.

In one embodiment, the socket routine 90 creates the socket 94 and may be thought of as providing a file descriptor that describes a stream. The socket routine 90 obtains or is provided the address or the target where the data or information coming off the socket 94 should be provided. The COBOL program 92 maps the address of the memory location 58 to the working storage section of the COBOL program 92 and, thereafter, the COBOL program 92 can analyze the information obtained from the socket 94 in any desirable manner. The previous example illustrates the additional functionality and flexibility provided by this socket routine 90 to enable COBOL programmers the ability to do messaging in a distributed environment, for example.

To accomplish writing to the socket 94, the COBOL program 92 may, in one embodiment, write the information or data to the memory 58 or provide the information directly to the socket routine 90. The socket routine 90 obtains the information and writes, via the operating system 64, the information to the socket 94. To accomplish the various socket 94 related functions, the socket routine 90 is provided with a number of functions callable from the COBOL program 92 or enabled by the technical layer, including a create function to create a new socket, an attach function to attach to existing sockets, and an open function to open the socket 94.

Other functions in the socket routine 90 include a write function to write data into the socket 94 and a block function to prevent writing when the socket 94 is full. A read function reads data from the socket 94, in a manner similar to that described above. A remove function enables the socket routine 90 to remove sockets 30 from the system, and a delete function is operable to delete sockets where the socket 94 has not yet been opened. As previously discussed, a number of the socket functions described above may be enabled via operating system 64 or other calls from the socket routine 90 to enable the COBOL program 92 for communications via the socket 94. In one aspect, the socket routine 90 may include a listening port function that allows the socket routine 90 to monitor the socket 94 for communications and additional functionality for managing the connection of the socket 94.

Using the application monitor system 10 described above, the internal states of applications 12, 22 can be easily monitored via the user interface 28. The user interface 28 requests the value of a variable, for example the value of variable var1 16a associated with the first application 12, from the client 20. The client 20 communicates over the socket connection with the monitor module 18 to request the value of a variable, for example the value of var1 16a. The monitor module 18 reads the first shared memory 14 to obtain the value of a variable, for example the value of var1 16a and returns this value to the client 20. The client 20 returns this value to the user interface 28 which displays this value. The application monitor system 10 may be implemented in any programming language and is not limited to being implemented in COBOL. Similarly, the applications 12, 22 may be implemented in any programming language and are not limited to being implemented in COBOL.

Memory Attachment Embodiment

Figure 4:
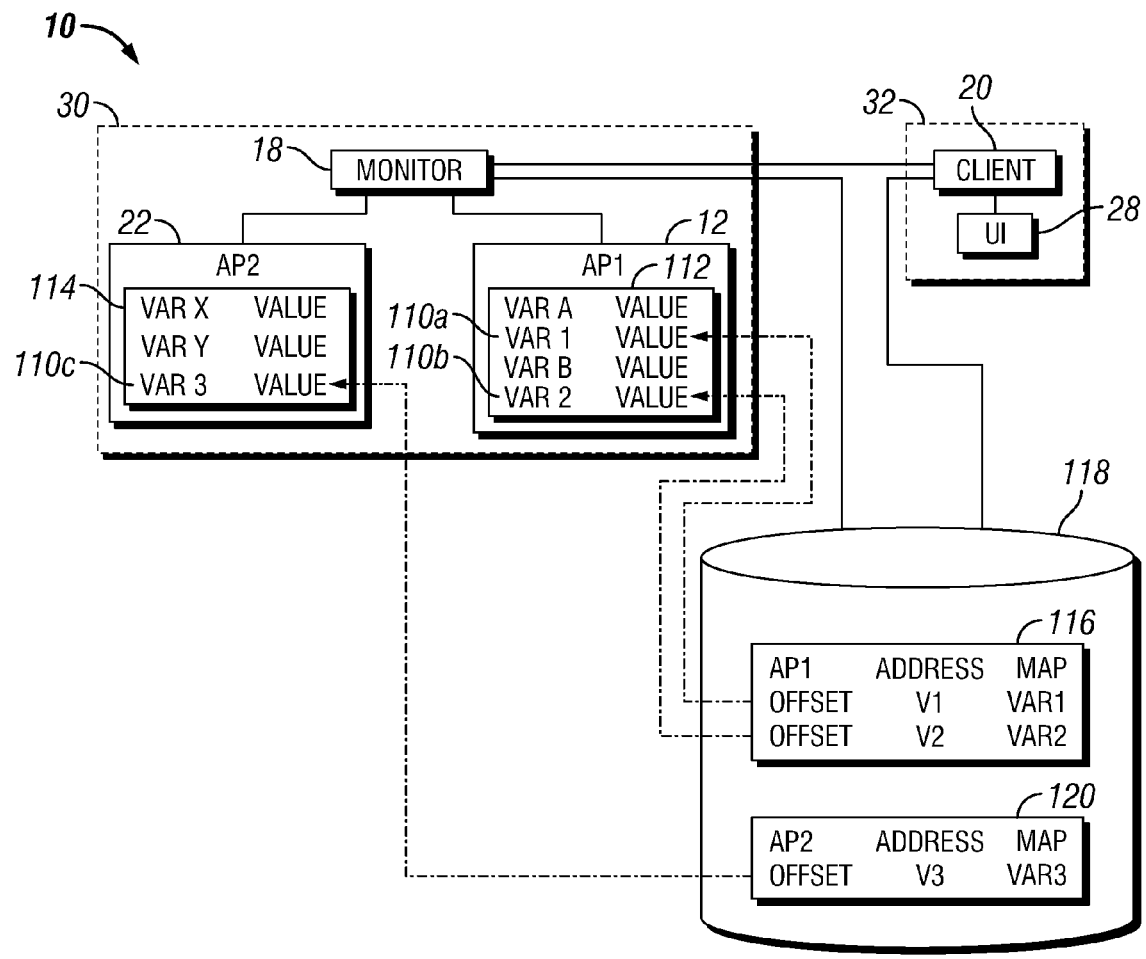
FIG. 4 is a block diagram of an application monitor system according to another embodiment.

Turning now to FIG. 4 another embodiment of the application monitor system 10 for accessing the value of internal application variables is depicted. A monitor module 18 is in communication with a client 20 which requests the values of variables 110, such as var1 110a and var2 110b, from the first application 12. The monitor module 18 is operable to attach to a first memory area 112 of the first application 12 and to read the values of the variables 110 from the first memory area 112. The monitor module 18 sends the values of the variables 110 to the client 20. The first application 12 writes values into the first memory area 112 during the normal course of executing.

The client 20 may also request the values of variables 110, such as var3 110c, from the second application 22. The monitor module 18 is also operable to attach to a second memory area 114 of the second application 22. The second application 22 writes values into the second memory area 114 during the normal course of executing. The monitor module 18 is operable to read the values of the variables 110 from the second memory area 114 and to send these values to the client 20. Note that while two applications are depicted in FIG. 4, any number of applications executing on the computer system 30 may be concurrently monitored by the monitor module 18. Also note that while the client 20 is depicted in communication with only one monitor module 18 in FIG. 4, the client 20 may communicate concurrently with multiple monitors 18.

A user interface 28 is in communication with the client 20. The user interface 28 is operable to select the applications 12, 22 and to select the variables 110 and 111 and to communicate these selections to the client 20. The user interface 28 is further operable to receive the values of variables 110 from the client 20 and to display these values.

The applications 12, 22 and the monitor module 18 are computer programs or applications which execute on a general purpose computer system 30. The client 20 and the user interface 28 are computer programs or applications which execute on a general purpose computer system 32. General purpose computer systems will be discussed in more detail hereinafter.

Applications, such as the first application 12 and the second application 22, are typically compiled and linked to create a loadable object or image file which is executable. When the executable is run on the computer system, such as general purpose computer system 30, the application is loaded into the computer system memory. Typically the application is loaded into memory in three sections including an instruction section, a data section, and a stack or dynamic memory section. These sections may or may not be contiguous in memory. The instruction section comprises the computer instructions encoded by the application. The data section comprises memory reserved for variables defined in the application. The stack section comprises a block of memory which the application may dynamically allocate, use, and de-allocate during execution.

The applications 12, 22 write into the memory areas 112, 114 while executing. Note that in this embodiment it is not necessary for the applications 12, 22 to mirror the values of internal variables by writing duplicate values in shared memory regions 14, 24. In this embodiment the applications 12, 22 do not need to be changed to enable the operation of the application monitor system 10. This aspect of this embodiment is useful if different user communities employ the monitor at different stages of the software lifecycle. For example, the variables which the original software developer may be interested in during the test phase may not be those that a business analyst is interested in when the software is deployed and in service. Because all the application 12, 22 variables are accessible in the memory areas 112 and 114, the needs of various user communities are readily satisfied.

When the client 20 requests variables 110 from application 12, the monitor module 18 attaches to the memory area 112 of the application 12. Typically the monitor module may attach to the memory area 112 by executing operating system calls. The monitor module 18 may remain attached to the memory area 112 after completing the request of the client 20, or the monitor module 18 may un-attach after completing the request of the client 20. In some embodiments a memory manager may be employed to provide the monitor module 18 with information needed to attach to the memory areas 112 and 114, for example the first address and the total size of the memory areas 112 and 114.

A first address map 116 is stored in secondary storage 118. This secondary storage may be closely associated with computer system 30, with computer system 32, or with some other remote computer system. The first address map 116 contains a listing of all variables names associated with the first application 12 and their address offset relative to the first instruction in the first application 12 executable file. The address offset is used to generate an address to read the value of the variable from the first memory area 112. Similarly, a second address map 120 is stored in secondary storage 118 which contains a listing of all variable names associated with the second application 22 and their address offset relative to the beginning of the second application's 22 address space. The address maps 116 and 120 may be generated when compiling and linking the applications.

In some embodiments the client 20 accesses the secondary storage 118, reads the address map 116 or 120, identifies the address offset associated with a selected variable, and sends the address offset to the monitor module 18 when requesting a variable value. In this case, the monitor module 18 reads the value at the address offset in the memory area 112 or 114 and returns the value to the client 20. In other embodiments the monitor module 18 receives a client 20 request for the value of a variable, wherein the client 20 names the variable, the monitor module 18 accesses the secondary storage 118, reads the address map 116 or 120, identifies the address offset associated with the variable name, reads the value at the address offset stored in the memory area 112 or 114, and returns the value to the client 20.

As discussed above under the shared memory embodiment, the user interface 28 may make various uses of the data access provided by the application monitor system 10. This data may be periodically written to a database or to a file. The data may be employed to generate one or more graphical depictions of current operating conditions including bar charts and pie charts. The data may be employed to track and display a "heartbeat" indication of the health of an application. This heartbeat may be ascertained, for example, by monitoring a total number of database records processed by an application. The heartbeat information may be used, for example, to determine the status, progress, and efficiency of an application being monitored by the monitor module 18. The data may be employed to trigger action by an independent application. For example, where the heartbeat detects that an application has halted processing, the application monitor system 10 may initiate any number of processing including shutting down and restarting the application, including launching recovery applications and systems. The user interface 28 may be used interactively to select for display variable values and to display those selected variable values.

In some embodiments the client 20 may send the variables 110, including the variable name and variable value, to the user interface 28 in extensible markup language (XML) format. XML supports flexible formatting of the variable names and variable values for transmission to the user interface 28.

The client and monitor may communicate using a socket connection. When sockets are employed, the monitor module 18 acts as a socket server and the client 20 acts as a socket client. As discussed under the shared memory embodiment of the application monitor system 10, when COBOL is employed as the programming language for encoding the applications 12 and 22 a technical layer may be employed to provide convenient access to operating system socket services.

The embodiment of the application monitor system 10 where on the monitor module 18 attaches to the first memory area 112 of the first application 12 may be implemented in any programming language and is not limited to being implemented in COBOL. The applications 12, 22 monitored by the application monitor system 10 may be implemented in any programming language and need not be implemented in COBOL.

General Purpose Computer Systems

Figure 5:
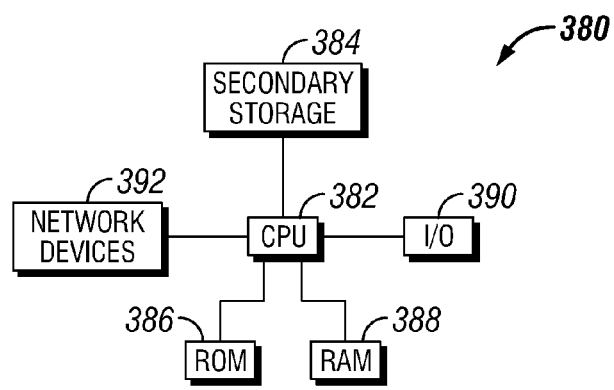
FIG. 5 illustrates an exemplary general purpose computer system suitable for implementing the several embodiments of the application monitor system.

The application monitor system 10 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

I claim:

1. A system for non-intrusively monitoring an application, comprising:
    a first COBOL (Common Business Oriented Language) program module stored on a non-transitory computer-readable medium that is programmed to share and attach through a technical layer to a shared memory area created by the application and used by the application during real-time operation to store application values in the shared memory area, the first module is further programmed to read at least one application value from the shared memory area that has been stored in the shared memory area by the application during real-time operation, wherein the first COBOL program module is programmed with COBOL that does not provide support for features to share and attach to the shared memory area, and wherein the technical layer comprises a shared memory routine that includes functions for managing shared memory that enable the first COBOL program module to share and attach to the shared memory area;
    a second module stored on a non-transitory computer-readable medium in communication with the first COBOL program module that requests the first COBOL program module to read the application values, the second module receives the application values from the first module; and
    a third module stored on a non-transitory computer-readable medium in communication with the second module that displays the application values.

2. The system of claim 1, wherein the at least one application value is further defined as at least one application variable and a value for the at least one application variable.

3. The system of claim 1, wherein the first COBOL program module is further configured to communicate the application values to the second module in hypertext markup language format.

4. The system of claim 1, wherein the third module is further defined as a graphical user interface.

5. The system of claim 4, wherein the graphical user interface is further configured to receive an input identifying the application values to be read and configured to request the application values identified to the first COBOL program module, via the second module, and wherein the first COBOL program module is configured to read the requested application values data from the shared memory area and return the application variables to the graphical user interface, via the second module.

6. The system of claim 4, wherein the graphical user interface is further configured to receive an input identifying requested application values to be displayed.

7. The system of claim 1, wherein the first COBOL program module is further configured as a socket server through the technical layer and wherein the second module is further configured as a socket client such that the first COBOL program module and second module communicate via a socket connection.

8. The system of claim 1, wherein the first COBOL program module reads application values stored in the shared memory area by the at least one application while the at least one application is running.

9. The system of claim 8, wherein the first COBOL program module reads application values stored in the memory area by the at least one application without interfering with the operation of the at least one application.

10. The system of claim 1, wherein the second module is a second COBOL program module, wherein the second COBOL program module and the first COBOL program module are in communication using a socket connection established through the technical layer, wherein the first COBOL program module and the second COBOL program module are programmed with COBOL that does not provide support for socket connections, and wherein the technical layer comprises a socket routine that enables the first COBOL program module and the second COBOL program module to manage socket communications through operating system calls.

11. A method of non-intrusively monitoring operation of an application, comprising:
    attaching, by a COBOL (Common Business Oriented Language) program monitor through a technical layer, to a memory area created by the application, wherein the memory area includes application values generated by the application and written by the application to the memory area during operation of the application in a real-time manner, wherein the COBOL program monitor is programmed with COBOL that does not provide support for features to attach to the memory area, and wherein the technical layer comprises a memory routine that includes a function for attaching to a memory area that enables the COBOL program monitor to attach to the memory area;
    reading, by the COBOL program monitor, the memory area used by the application to obtain the application values, wherein at least one of the application values is not output by the application; and displaying the application values read from the memory area.

12. The method of claim 11, further comprising:
requesting, by a client, the application values from the COBOL program monitor; and
communicating the application values from the COBOL program monitor to the client.

13. The method of claim 12, further comprising:
attaching, by the COBOL program monitor through the technical layer, to a plurality of memory areas that include application values generated by a plurality of applications during operation of the plurality of applications in a real-time manner;
reading, by the COBOL program monitor, from the plurality of memory areas used by the plurality of applications to obtain the application values generated by the plurality of applications; and
displaying the application values generated by the plurality of applications.

14. The method of claim 13, wherein the memory area is further defined as a block of memory.

15. The method of claim 12, further comprising providing a memory manager and wherein the COBOL program monitor registers with the memory manager to obtain a location of the memory area used by the application to store the application values.

16. The method of claim 12, further comprising:
requesting, by the client, that the monitor re-read the application values stored in the memory area, at least some of the application values including new application values generated by the application and stored in the memory area, at least one of the new application values defined as a new value for a variable of the application;
re-reading, by the COBOL program monitor, the memory area to obtain the new application values.

17. The method of claim 16, wherein the COBOL program monitor reads the application values while the application is running.

18. The method of claim 12, wherein the COBOL program monitor is configured as a socket server through the technical layer and wherein the client is configured as a socket client such that the communication between the COBOL program monitor and client is via a socket connection.

19. The method of claim 11, wherein the application values are further defined as a variable of the application and a value of the variable.

20. A system for non-intrusively monitoring variables during operation of an application, comprising:
a compile listing stored on a non-transitory computer-readable medium having an address map with an offset associated with each of a plurality of variables of an application; and
a COBOL (Common Business Oriented Language) program module stored on a non-transitory computer-readable medium that is programmed to perform reading of the compile listing and obtaining the offset of at least one of the plurality of variables of the application, the COBOL program module further programmed to perform attaching through a technical layer to an address space used by the application during real-time operation of the application to obtain a value for one or more of the plurality of variables written to the address space by the application during the real-time operation of the application using the offset, wherein the COBOL program module is programmed with COBOL that does not provide support for features to attach to the address space, and wherein the technical layer comprises a memory routine that includes a function for attaching to an address space that enables the COBOL program module to attach to the address space.

21. The system of claim 20, wherein the COBOL program module is further programmed to read the compile listing and convert at least one of the plurality of variables to the associated offset.

22. The system of claim 20, wherein the COBOL program module is further configured to search the compile listing and display the plurality of variables of the application for selection by a user.

23. The system of claim 22, wherein the COBOL program module is responsive to selection by the user of one of the plurality of variables to obtain the value for the selected one of the plurality of variables using the offset to locate the value of the variable in the address space.

24. The system of claim 23, wherein the COBOL program module is further configured to display the selected one of the plurality of variables.

25. The system of claim 20, wherein the address space is further defined as a memory space and wherein the COBOL program module attaches, using a socket layer of the technical layer, to the memory space used by the application.

26. The system of claim 25, wherein the COBOL program module attaches, using the offset, to the memory space used by the application via an operating system service accessible through the technical layer.

27. The system of claim 20, wherein the COBOL program monitor is further configured, using the compile listing, to query the address map for one or more of the plurality of variables of the application.

28. The system of claim 20, wherein the COBOL program module is further configured to attach to the memory space where the application is operating and overwrite the value for one or more of the plurality of variables using the offset.

29. The system of claim 20, wherein the COBOL program module comprises:
a reader component programmed to read the compile listing and further programmed to convert at least one of the plurality of variables of the application to the associated offset; and
a search component programmed to receive the associated offset of the at least one of the plurality of variables from the reader component, the search component programmed to attach to the application and locate the value of the at least one of the plurality of variables using the offset.

30. The system of claim 20, further comprising a display component operably coupled to the COBOL program module to perform receiving the value for the one or more of the plurality of variables, the display component configured to perform displaying the value.

31. The system of claim 30, wherein the display component is configured to employ the value to display a heartbeat.

32. The system of claim 30, wherein the display component is configured to employ the value to display as a percentage complete.

33. A system for non-intrusively monitoring COBOL application values, the system comprising:
a COBOL (Common Business Oriented Language) program stored on a non-transitory computer-readable medium that is programmed to create a shared memory area through a technical layer, generate program values, and store the program values in the shared memory area during real-time operation of the COBOL program, wherein the COBOL program is programmed with COBOL that does not provide support for features to create the shared memory area, and wherein the technical layer comprises a shared memory routine that includes a function for creating shared memory that enables the COBOL program module to create the shared memory area; and a COBOL program monitor module stored on a non-transitory computer-readable medium that is programmed to share the shared memory area with the COBOL program through the technical layer, and the COBOL program monitor module is programmed to read the program values stored in the shared memory area by the COBOL program during real-time operation of the COBOL program, wherein the COBOL program monitor is programmed with COBOL that does not provide support for features to share the shared memory area, and wherein the technical layer comprises a shared memory routine that includes a function for sharing shared memory that enables the COBOL program module to share the shared memory area.

34. The system of claim 33, further comprising:

a second COBOL program configured to generate second program values and store the program values in the shared memory area during real-time operation of the second COBOL program, and wherein the COBOL program monitor module is further configured to read the second program values stored in the shared memory area by the second COBOL program.

35. The system of claim 33, further comprising:

a second memory area; and a second COBOL program configured to generate second program values and store the program values in the second memory area during real-time operation of the second COBOL program, and wherein the COBOL program monitor module is further configured to read the second program values stored in the second memory area by the second COBOL program.

36. The system of claim 33, further comprising:

a user interface configured to monitor and display the application values; and a client application in communication with the user interface and the COBOL program monitor module, the client application configured to request the program variables of the COBOL program from the COBOL program monitor module and provide the program variables to the user interface for display via the user interface responsive to a request from the user interface.

* * * * *